172-753
BEST AVAILABLE COPY
3130X
J. WOOD.
Plow.
113
Patented Sep. 1, 1819.
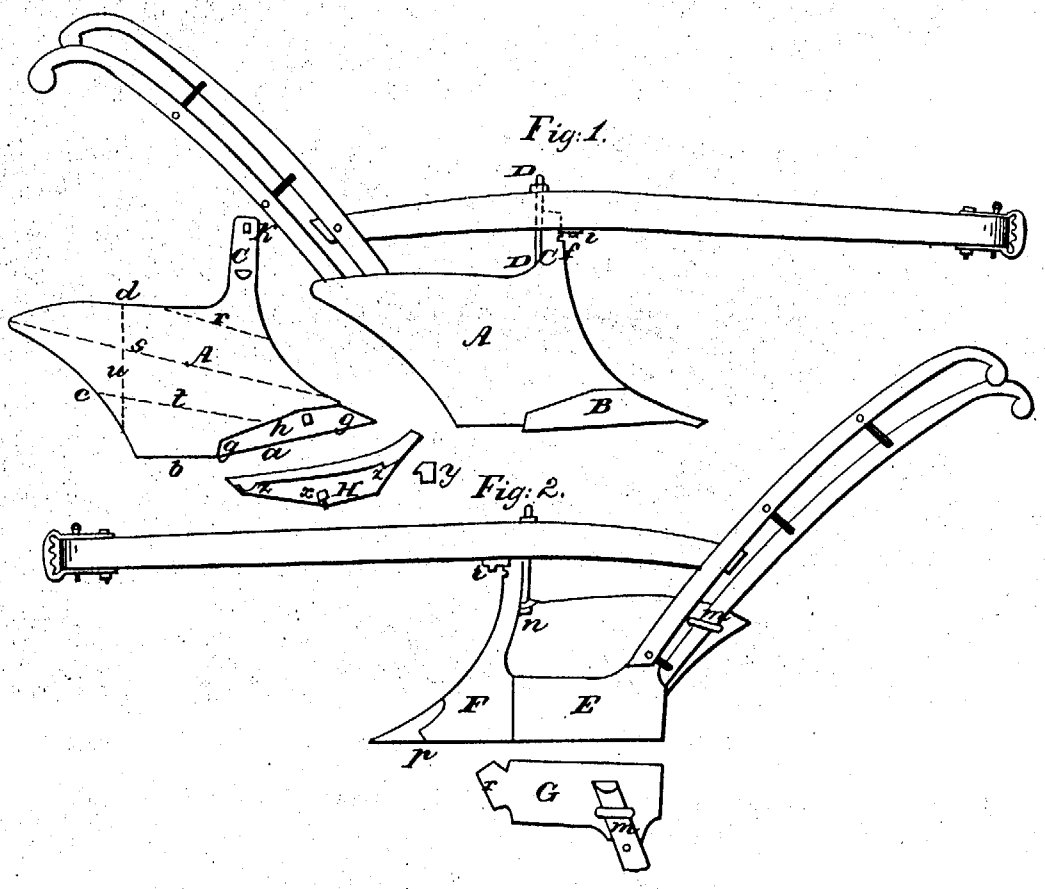
N. PETERS, PHOTO-LITHOGRAPHER, WASHINGTON, D. C.

3130X

UNITED STATES PATENT OFFICE.

JETHRO WOOD, OF POPLAR RIDGE, NEW YORK.

IMPROVEMENT IN PLOWS.

Specification forming part of Letters Patent dated September 1, 1819.

*To all whom it may concern:*

Be it known that I, JETHRO WOOD, of Poplar Ridge, county of Cayuga, and State of New York, have invented a new and useful Improvement in Plows, of which the following is a specification.

Considering the manifold errors and defects in the construction of plows, and the inconvenience experienced in the use of them, the petitioner and inventor hath applied the powers of his mind to the improvement of this noble utensil, and produced a plow so far superior to those in common use that he asks an exclusive privilege for the same from the government of his country. The principal matters for which he solicits Letters Patent he now reduces to writing, and explains in words and sentences as appropriate and significant as he possibly can; but being perfectly aware of the feebleness and insufficiency of language to convey precise and adequate ideas of complicated forms and proportions, the said JETHRO WOOD annexes to these presents a delineation upon paper of his said new and improved plow, with full and explanatory notes, urging with earnestness and respect that the delineation and notes may be considered as part of this communication.

The said petitioner and inventor also being perfectly convinced, as a practical man, that a model of his inventions and improvements will convey and preserve the most exact and durable impressions of the matters to which he lays claim, he sends herewith a model of the due form and proportions of each as a just exhibition of his principle, and of its application to the construction and improvement of the plow, requesting that the same may be kept in the Patent Office as a perpetual memorial of the invention and its use.

In the first place, the said JETHRO WOOD claims an exclusive privilege for constructing the part of the plow heretofore and to this day generally called the "mold-board," in the manner hereinafter mentioned. This mold-board may be termed a "plano-curvilinear figure," not defined nor described in any of the elementary books of geometry or mathematics; but an idea may be conceived of it thus: The landside of the plow, measuring from the point of the mold-board, is two feet and two inches long. It is a straight-lined surface, from four to five and one-half inches wide and half an inch thick. Its more particular description will be hereinafterward given. It is sufficient to observe here that of the twenty-six inches of length on the landside eighteen inches belong to the part of the plow strictly called the "landside" and eight inches to the mold-board. The part of the mold-board comprehended by this space of eight inches is very important, affording weight and strength and substance to the plow, enabling it the better to sustain the cutting-edge for separating and elevating the soil in sward, and likewise the standard for connecting the mold-board with the beam, as will hereinafter be described more at large.

The figure of the mold-board as observed from the furrow side is a sort of irregular pentagon or five-sided plane, though curved and inclined in a peculiar manner. Its two lower sides touch the ground, or are intended to do so, while the three other sides enter into the composition of the oblique or slanting mold-board, overhanging behind, vertical midway, and projecting forward. The angle of the mold-board as it departs from the foremost point of or at the landside is about forty-two degrees, and the length of it, or, in other words, at the first side, is eleven inches. The line of the next or the second side is nearly, but not exactly, parallel with the before-mentioned right-lined landside, for it widens or diverges from the angle at which the first and second sides join toward its posterior or hindermost point as much as one inch. Hence the distance from the hindmost point of the mold-board at the angle of the second and third sides directly across to the landside is one inch more than it is from the angle of the first and second sides directly across. The length of this the second side is eight inches. The next side, or what is here denominated the "third side," leaves the ground or furrow in a slanting direction backward, and with an overhanging curve exceeding the perpendicular outward from three to six inches, according to the size of the plow. The length of this third side is fourteen inches and one-half. The fourth side of this mold-board is horizontal, or nearly so, extending from the uppermost point of the third side to the fore part or pitch eighteen inches. The fifth or last side descends or slopes from the last-mentioned mark, spot, or pitch to the place of beginning at the low and fore point of the mold-board, where it joins the land-

3130X side. Its length is thirteen inches. Besides these properties and proportions of his mold-board, the said JETHRO WOOD now explains other properties which it possesses and by which it may be and is distinguished from every other invented thing. The peculiar curve has been compared to that of the screw-auger, and it has been likened to the prow of a ship. Neither of these similitudes conveys the fair and proper notion of the inventor.

The mold-board which the said JETHRO WOOD claims as his own, and which is the result of profound reflection and of numberless experiments, is a sort of plano-curvilinear surface, as hereinbefore stated, having the following bearings and relations: A right line drawn by a chalked string or chord, or by a straight rule, diagonally or obliquely upward and backward from a point two inches and a half-inch above the tip or extremity of the mold-board to the angle where the third and fourth sides of the mold-board join, touches the surface the whole distance in an even and uniform application, and leaves no sinking depression, hole, cavity, rising, bump, or protuberance in any part of the distance. So at a distance half-way between the diagonal line just described and the angle between the first and second sides, a line drawn parallel to the diagonal line already mentioned will receive the chalked string or cord, or the straight rule, as on a uniform and even surface without the smallest bend, sinuosity, or bunch, whereby earth might adhere to the mold-board and impede the motion and progress of the plow under, through, and along the soil. In a like manner, if a point be taken one inch behind the angle connecting the second and third sides and a perpendicular be raised upon it, that perpendicular will coincide with the vertical portion of the mold-board in that place; or, in other words, if a plumb-line be let fall so as to reach a point one inch behind the last-mentioned angle, then such a plumb-line will hang parallel with the mold-board the whole way, the line of the mold-board there neither projecting nor receding, but being both a right line and a perpendicular line. Moreover, if a right line be drawn from a point on the just-described perpendicular one inch, or thereabout, above the upper margin of the fourth side and from the point to which the said perpendicular, if continued, would reach if, the said JETHRO WOOD repeats, a right line be drawn downward and forward, not exactly parallel to the diagonal herein already described, but so diverging from the same that it is one inch more distant or farther apart at its termination on the fifth side of the mold-board than at its origin or place of beginning, such line so beginning, continued, and ended is a right line parallel to the mold-board along its whole course and direction, and the space over which it passes has no inequality, hill, or hollow thereabout. Furthermore, an additional property of his mold-board is that if it be measured and proved various ways vertically and obliquely by the saw in fashioning it, and by the rule in meting it, and by the chalk-line in determining it, the capital and distinguishing character of right lines extending on, over, and along the peculiar curve which his mold-board describes is always and inseparably present. This grand and discriminating feature of his mold-board he considers of the utmost importance. He therefore craves the aid and elucidation of his drawings and of his model in their totality and in their several parts to render plain and sure whatever there may be from the abstruse and recondite nature of the subject uncertain or dubious in the language of his specification.

In the second place, the said JETHRO WOOD claims an exclusive right and privilege in the construction of a standard of cast-iron like the rest of the work already described, for connecting the mold-boards with the beam. This standard is broad, stout, strong, and rises from the fore and upper part of the mold-board, being cast with it, and being a projection or continuation of the same from where the fourth and fifth sides meet, its figures, strength, and arrangement are such as best to secure the connection and to enable the standard thus associated with the beam to bear the pull, tug, and brunt of service. By a screw-bolt and nut properly adjusted above the top of the standard and acting along its side, assisted, if need require, by a wedge for tightening and loosening, the beam may be raised and lowered, and the mold-board, with its cutting-edge, enabled to make a furrow of greater or smaller depth, as the plowman may desire, and a latch and key fixed to the beam, and capable of being turned into notches, grooves, or depressions on one edge or narrow side of the standard, serve to keep the beam from settling or descending. By means of the screw-bolts, wedges, latches, and keys, with their appropriate notches, teeth, and joggles, the plow may be deepened or shallowed most exactly.

In the third place, the said JETHRO WOOD claims an exclusive privilege in the inventions and improvements made by him in the construction of the cutting-edge of the mold-board, or what may be called in plain language "the plowshare." The cutting-edge consists of cast-iron, as do the mold-board and landside themselves. It is about twelve inches and one-half of one inch long, four inches and one-half of one inch broad, and in the thickest part three-quarters of an inch thick. It is so fashioned and cast that its fits snugly and nicely into a corresponding excavation or depression at the low and fore edge of the mold-board along the side hereinbefore termed the "first" side. When properly adapted the cutting-edge seems by its uniformity of surface and evenness of connection to be an elongation of the mold-board, or, as it were, an extension or continuation of the same. To give the cutting-edge firm coherence and connection, it is secured to the mold-board by two or more knobs, pins, or heads in the inner and higher side, which are received into one or more holes in the fore

3130X and lower part of the mold-board. By this mechanism the edge is lapped on and kept fast and true without the employment of screws. That the cutting-edge may be more securely and immovably kept in its place, it has a groove or ship-lap of one inch in length below or at its under side, near the angle between the first and second sides, for the purpose of holding, and for the further accomplishment of the same object another groove or ship-lap, stouter and stronger than the preceding, is also cast in the iron at or near the points of the mold-board, so as to cover, incase, and protect it effectually on the upper and lower sides, but not on the land side. After the cutting-edge is thus adapted and adjusted to the mold-board by means of the indentations, pins, holes, ship-laps, and fastenings, it is fixed to its place and prevented from slipping back or working off by wedges or pins of wood or other material driven into the holes from the inner and under side and forced tight home by a hammer.

In the fourth place, the said JETHRO WOOD claims the exclusive right of securing the handles of his plow to the mold-board and landside of the plow by means of notches, ears, loops, or holders cast with the mold-board and landside, respectively, and serving to receive and contain the handles without the use of nuts and screws. For this purpose one or more ears or loops or one or more pairs of notches or holders are cast on the inner side of the mold-board and landside, toward their hinder or back parts or near their after margins, for the reception of the handles of the plow, and therefore when duly entered and fitted are wedged instead of being fastened by screws.

In the fifth place, the said JETHRO WOOD claims an exclusive right to his invention and improvement in the mode of fitting, adapting, and adjusting the cast-iron landside to the cast-iron mold-board. Their junction is after the manner of tenon and mortise, the tenon being at the fore end of the landside, and the mortise being at the inside of the mold-board and near its point. The tenon and mortise are joggled or dovetailed together in the casting operation, so as to make them hold fast. The fore end of the tenon is additionally secured by a cast projection from the inside of the mold-board formed for its reception, and if any other tightening or bracing should be requisite a wooden wedge well driven in will bind every part effectually, and all this is accomplished without the assistance or instrumentality of screws.

The said inventor and petitioner wishes it to be understood that the principal metallic material of his plow is cast-iron. He has very little use for wrought-iron, and by adopting the former to the extent he has done and by discontinuing the latter he is enabled to make the plow stronger and better, as well as more lasting and cheap. He also claims and hereby asserts the right of varying the dimensions and proportions of his plow and of its several sections and parts in the relation of somewhat more and somewhat less of length, breadth, the thickness, and composition according to his judgment or fancy, so that all the while he adheres to his principle and departs not from it.

Regarding each and every of the matters submitted as very conducive to the reputation and emolument of the said JETHRO WOOD, he relies confidently upon a benign and favorable construction of his petition and specification by the constituted authorities of his country.

Given under his hand, at the city of New York, this 14th day of August, 1819, in the presence of two witnesses, as to wit.

JETHRO WOOD.

Witnesses:

SAM. L. MITCHELL,

I. G. BOGERT.